United States Patent
Lee et al.

(10) Patent No.: US 9,923,586 B2
(45) Date of Patent: Mar. 20, 2018

(54) APPARATUS AND METHOD FOR ESTIMATING CARRIER FREQUENCY OFFSET FOR MULTIPATH SIGNALS

(71) Applicant: MStar Semiconductor, Inc., Hsinchu Hsien (TW)

(72) Inventors: Kuan-Chou Lee, Hsinchu Hsien (TW); Yu-Che Su, Hsinchu Hsien (TW); Tai-Lai Tung, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 0 days.

(21) Appl. No.: 15/401,310

(22) Filed: Jan. 9, 2017

(65) Prior Publication Data

US 2017/0201409 A1   Jul. 13, 2017

(30) Foreign Application Priority Data

Jan. 12, 2016   (TW) .............................. 105100819 A (51) Int. Cl.
| | |
|---|---|
| *H04B 1/10* | (2006.01) |
| *H04L 27/00* | (2006.01) |
| *H04L 27/26* | (2006.01) |

(52) U.S. Cl.
CPC ....... *H04B 1/1081* (2013.01); *H04L 27/0014* (2013.01); *H04L 27/2657* (2013.01); *H04L 27/2672* (2013.01)

(58) Field of Classification Search
CPC .. H04L 27/34; H04L 27/2334; H04L 27/2614
See application file for complete search history.

(56) References Cited

U.S. PATENT DOCUMENTS

| | | | | |
|---|---|---|---|---|
| 6,240,282 B1* | 5/2001 | Kleider | .................. | H04B 17/20 375/285 |
| 8,611,472 B2* | 12/2013 | Mishra | ................ | H04L 27/0014 375/260 |
| 2016/0014005 A1* | 1/2016 | Zillmann | .............. | H04L 1/0083 370/253 |

FOREIGN PATENT DOCUMENTS

| | | |
|---|---|---|
| CN | 1980207 A | 6/2007 |
| CN | 103297363 A | 9/2013 |

OTHER PUBLICATIONS

TIPO Office Action, dated Mar. 28, 2017, 5 pages.

* cited by examiner

*Primary Examiner* — Janice Tieu
(74) *Attorney, Agent, or Firm* — Edell, Shapiro & Finnan, LLC (57) ABSTRACT

An apparatus for estimating carrier frequency offset for multipath signals includes an echo signal filtering circuit, an $M^{th}$ power circuit, a spectrum generating circuit, a peak frequency determining circuit and a frequency offset determining circuit. The echo signal filtering circuit filters out an echo signal from an input signal to generate a filtered signal. The $M^{th}$ power circuit performs an $M^{th}$ power calculation on the filtered signal to generate an $M^{th}$ power calculation result. The spectrum generating circuit generates an $M^{th}$ power spectrum according to the $M^{th}$ power calculation result. The peak frequency determining circuit determines a peak frequency corresponding to an amplitude peak from the $M^{th}$ power spectrum. The frequency offset determining circuit determines an estimated carrier frequency offset according to the peak frequency.

12 Claims, 6 Drawing Sheets

APPARATUS AND METHOD FOR ESTIMATING CARRIER FREQUENCY OFFSET FOR MULTIPATH SIGNALS

This application claims the benefit of Taiwan application Serial No. 105100819, filed Jan. 12, 2016, the subject matter of which is incorporated herein by reference.

BACKGROUND OF THE INVENTION

Field of the Invention

The invention relates in general to an electronic signal receiving apparatus, and more particularly, to a technology for estimating carrier frequency offset in an electronic signal receiving apparatus.

Description of the Related Art

Various types of communication systems get more and more popular as related technologies in the electronics field continue to advance. Each of a transmitter and a receiver of a communication system is provided with at least one oscillation signal source (e.g., a quartz oscillator) that provides a clock signal as a basis for circuit operations. During an operation process, clock frequencies of the transmitter and the receiver need to achieve certain consistency in order to have the receiver correctly parse signals sent from the transmitter. If the frequency of a clock signal that the receiver adopts for down-converting an input signal differs from the frequency of a clock signal that the transmitter adopts for up-converting a baseband signal, such issue is commonly referred to as carrier frequency offset at the receiver. The carrier frequency offset may lead to inter-carrier interference, causing negative effects such as degraded system performance of the receiver, and the receiver may even become incapable of parsing its input signal in some severe cases.

A usual cause of the carrier frequency offset is mismatch between respective oscillators at a transmitter and a receiver. In practice, the transmitter and receiver may be fabricated by different manufactures based on different hardware of different specifications. Thus, exact matching between the oscillators at these two ends is extremely difficult, and so the receiver is usually designed with a mechanism for compensating carrier frequency offset. In general, a receiver needs to first correctly estimate the value of the carrier frequency offset before frequency offset compensation can be effectively conducted.

SUMMARY OF THE INVENTION

The invention is directed to an apparatus and method for estimating carrier frequency offset.

An apparatus for estimating carrier frequency offset for multipath signals is provided according to an embodiment of the present invention. The apparatus includes an echo signal filtering circuit, an $M^{th}$ power circuit, a spectrum generating circuit, a peak frequency determining circuit and a frequency offset determining circuit. The echo signal filtering circuit filters out an echo signal from an input signal to generate a filtered signal. The $M^{th}$ power circuit performs an $M^{th}$ power calculation on the filtered signal to generate an $M^{th}$ power calculation result, where M is an integer greater than 1 and is associated with a modulation scheme of the input signal. The spectrum generating circuit generates an $M^{th}$ power spectrum according to the $M^{th}$ power calculation result. The peak frequency determining circuit determines a peak frequency corresponding to an amplitude peak from the $M^{th}$ power spectrum. The frequency offset determining circuit determines an estimated carrier frequency offset according to the peak frequency.

A method for estimating carrier frequency offset is provided according to another embodiment of the present invention. An echo signal is filtered out from an input signal to generate a filtered signal. An $M^{th}$ power calculation is performed on the filtered signal to generate an $M^{th}$ power calculation result, where M is an integer greater than 1 and is associated with a modulation scheme of the input signal. An $M^{th}$ power spectrum is generate according to the $M^{th}$ power calculation result. A peak frequency corresponding to an amplitude peak is determined from the $M^{th}$ power spectrum. An estimated carrier frequency offset is determined according to the peak frequency.

The above and other aspects of the invention will become better understood with regard to the following detailed description of the preferred but non-limiting embodiments. The following description is made with reference to the accompanying drawings.

It should be noted that, the drawings of the present invention include functional block diagrams of multiple functional modules related to one another. These drawings are not detailed circuit diagrams, and connection lines therein are for indicating signal flows only. The interactions between the functional elements and/or processes are not necessarily achieved through direct electrical connections. Further, functions of the individual elements are not necessarily distributed as depicted in the drawings, and separate blocks are not necessarily implemented by separate electronic elements.

DETAILED DESCRIPTION OF THE INVENTION

Figure 1:
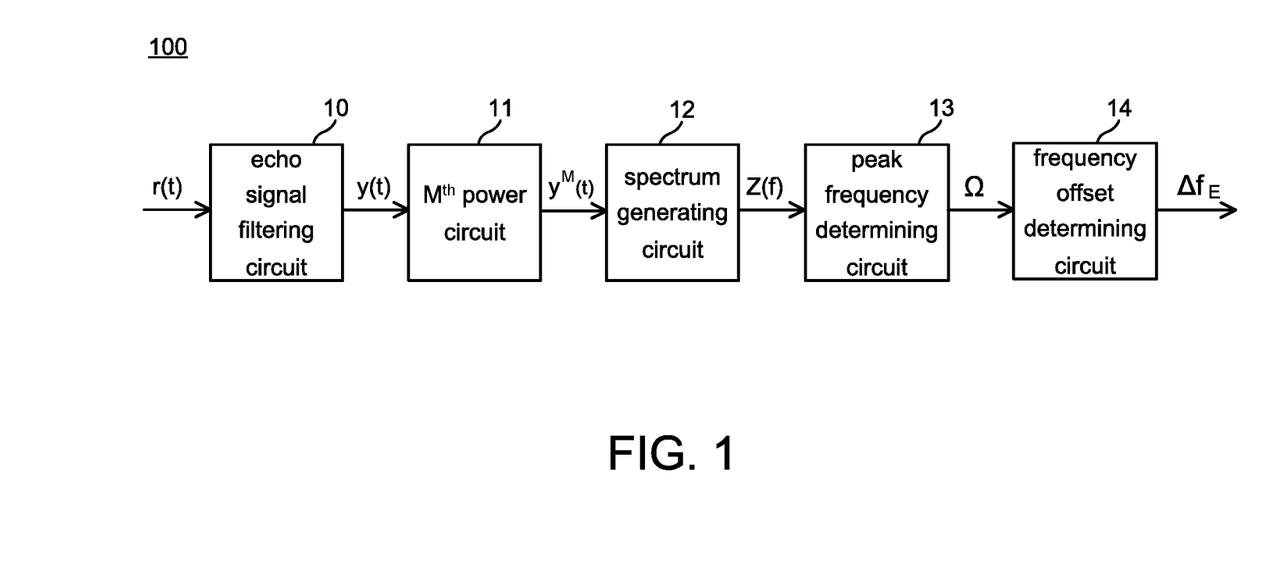
FIG. 1 is a function block diagram of a carrier frequency offset estimating apparatus according to an embodiment of the present invention.

The apparatus and method for estimating carrier frequency offset of the present invention may be applied to a receiver of various communication systems that need to estimate carrier frequency offset, for example but not limited to, a Digital Video Broadcasting-Satellite (DVB-S) receiver and a Digital Video Broadcasting-Cable (DVB-C) receiver. FIG. 1 shows a functional block diagram of a frequency carrier offset estimating apparatus according to an embodiment of the present invention. The frequency carrier offset estimating apparatus 100 includes an echo signal filtering signal 10, an $M^{th}$ power circuit 11, a spectrum generating circuit 12, a peak frequency determining circuit 13 and a frequency offset determining circuit 14. Functions of these circuits are given below.

An input signal r(t) provided to the echo signal filtering circuit 10 is a baseband signal. In practice, the baseband may be, for example but not limited to, a baseband signal correspondingly generated after a radio-frequency (RF) signal enters a receiver coordinating with the carrier frequency offset estimating apparatus 100 and passes circuits such a low-noise amplifying circuit, a down-converting circuit, an analog-to-digital converter (ADC) and a low-pass filter (LPF). The echo signal filtering signal filters out an echo signal from the input signal r(t) to generate a filtered signal y(t). The so-called echo signal refers to an interference signal, which is caused by a multipath effect and has frequency range similar to that of an actual signal. After the effect of the echo signal is eliminated, subsequent circuits are allowed to more accurately determine the carrier frequency offset.

Figure 2A:
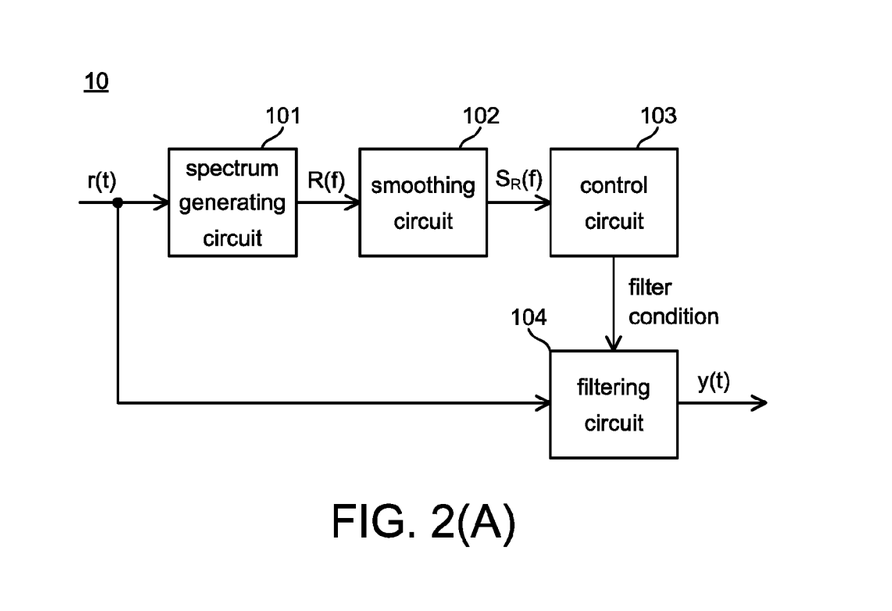
FIG. 2(A) is a detailed example of an echo signal filtering circuit according to an embodiment of the present invention.

FIG. 2(A) shows a detailed example of an echo signal filtering circuit 10 according to an embodiment. The echo signal filtering circuit 10 includes a spectrum generating circuit 101, a smoothing circuit 102, a control circuit 103 and a filtering circuit 104.

The spectrum generating circuit 101 generates an input signal spectrum R(f) according to the input signal r(t). In practice, the spectrum generating circuit 101, for example but not limited to, generates a spectrum using fast Fourier transform (FFT). It should be noted that, details for generating the spectrum are generally known to one person skilled in the art, and shall be omitted herein.

To mitigate minute disturbances in smaller frequency ranges in the input signal spectrum R(f) in order to better observe an overall change trend of the input signal spectrum R(f), the smoothing circuit 102 performs a smoothing process on the input signal spectrum R(f) to generate a smoothed spectrum $S_R(f)$. In practice, the smoothing circuit 102, for example but not limited to, generates the smoothed spectrum $S_R(f)$ by a moving averaging calculation. It should be noted that, details of a moving averaging calculation are generally known to one person skilled in the art, and shall be omitted herein.

The control circuit 103 determines a filter condition to be applied to the input signal r(t) according to the smoothed spectrum $S_R(f)$. The filtering circuit 104 performs a filtering process on the input signal r(t) according to the filter condition that is determined by the control circuit 103, and outputs a filtered signal y(t). In one embodiment, the filtering circuit 104 is a notch filter. Several examples that the control circuit 103 may use to generate the filter condition are described below.

Figure 2B:
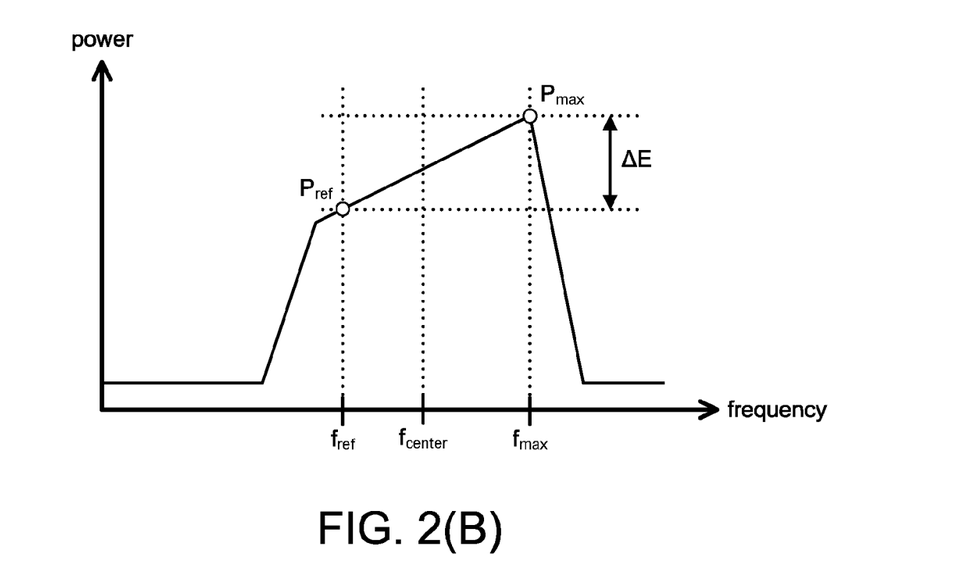
FIG. 2(B) is an example of a spectrum affected by an echo signal.

Based on actual observations, if the input signal r(t) contains an echo signal, the shape of the smoothed spectrum $S_R(f)$ appears less symmetrical at two side of a center frequency $f_{center}$, as shown in FIG. 2(B). In one embodiment, the control circuit 103 determines a frequency to be filtered out according to a frequency (e.g., a frequency $f_{max}$ in FIG. 2(B)) corresponding to a power peak $P_{max}$ of the smoothed spectrum $S_R(f)$, i.e., causing the filtering circuit 104 to attenuate a signal in the input signal r(t) that has a frequency substantially equal to $f_{max}$, so to as to eliminate the abovementioned asymmetry in the spectrum.

In another embodiment, the control circuit 103 determines a filtering intensity according to a relationship between the power peak $P_{max}$ and the smoothed spectrum $S_R(f)$. When differences between the power peak $P_{max}$ and other power points in the smoothed spectrum $S_R(f)$ are larger, the control circuit 103 may cause the filtering circuit 104 to increase the filtering intensity, e.g., changing from attenuating 6 dB to attenuating 12 dB. For example, from the smoothed spectrum $S_R(f)$, the control circuit 103 may identify a reference point (e.g., a power point $P_{ref}$ in FIG. 2(B)) different from the power peak $P_{max}$, and determine the filtering intensity according to a power difference ΔE between the power peak $P_{max}$ and the reference point $P_{ref}$. The filtering intensity may be higher as the power difference ΔE gets larger, and the relationship between the two may be determined by a circuit designer based on the rule of thumb. In practice, the method for selecting the reference point $P_{ref}$ may be determined by a circuit designer. For example, the control circuit 103 may determine the frequency $f_{ref}$ according to an equation:

$$f_{ref}=f_{center}-0.75\times(f_{max}-f_{center}) \quad (1)$$

The power point $P_{ref}$ is then accordingly determined. The value 0.75 in equation (1) is an example, and may be replaced by other values.

On the other hand, when the power difference ΔE is smaller than a predetermined threshold (e.g., the smoothed spectrum $S_R(f)$ is originally quite symmetrical), the control circuit 103 may suggest the filtering circuit 104 not to perform the filtering process (equivalently causing the filtering intensity to be 0), such that the filtered signal y(t) provided to subsequent circuits are identical to the input signal r(t).

Next, the $M^{th}$ power 11 performs an $M^{th}$ power calculation on the filtered signal y(t) that the echo signal filtering circuit 10 provides to generate an $M^{th}$ power calculation result $y^M(t)$, where M is an integer greater than 1 and is associated with a modulation scheme of the filtered signal y(t). For example, when the modulation scheme that a transmitter performs on its outputs signal is quadrature phase-shift keying (QPSK), the filtered signal is a QPSK signal, and the integer M may be equal to an integral multiple of 4; when the modulation scheme that a transmitter performs on its outputs signal is 8 phase-shift keying (8 PSK), the filtered signal is an 8 PSK signal, and the integer M may be an integral multiple of 8. By expressing the filtered signal y(t) as a complex signal A+Bj, a $4^{th}$ calculation result may be expanded as:

$$(A+Bj)^4=(A^2-B^2+2ABj)^2=(X+Yj)^2=X^2-Y^2+2XYj \quad (2)$$

Figure 3:
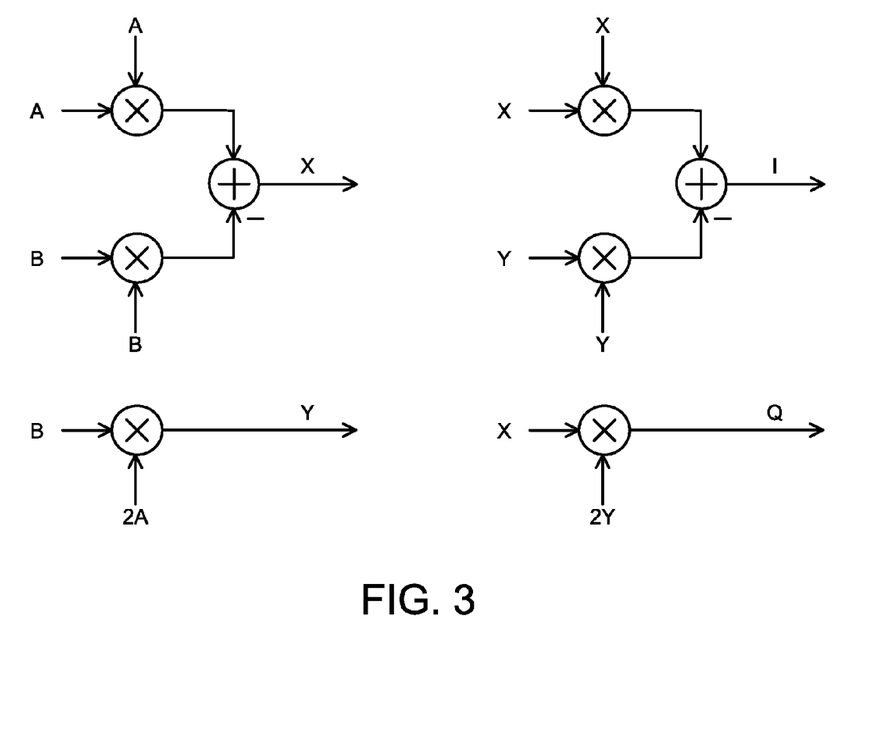
FIG. 3 is an example of a $4^{th}$ power calculation circuit according to an embodiment.

In equation (2), the signal $X=A^2-B^2$, and the signal $Y=2AB$. FIG. 3 shows an implementation example of a $4^{th}$ power calculation circuit based on equation (2). A signal I and a signal Q outputted at the end respectively represent a real part and an imaginary part of the $4^{th}$ power calculation result. Various types of $M^{th}$ power calculation circuits may be realized through the similar expansion concept.

The spectrum generating circuit 12 generates a spectrum, which is to be referred to as an $M^{th}$ power spectrum Z(f), according to the $M^{th}$ power calculation result $y^M(t)$ that the $M^{th}$ power circuit 11 outputs. In practice, when the echo signal filtering signal 10 is implemented by the example in FIG. 3, the spectrum generating circuit 12 and the spectrum generating circuit 101 may share hardware and be integrated into one single circuit.

The function of the $M^{th}$ power spectrum Z(f) are illustrated by taking an instance where the filtered signal y(t) is a QPSK signal and the multiple M is equal to 4. Assuming that an RF signal transmitted from a transmitter corresponds to a baseband signal x(t):

$$x(t)=\Sigma_k a_k g(t-kT) \quad (3)$$

In equation (3), g(t) represents a pulse shaping mechanism adopted by the transmitter, $\alpha_k$ represents a constellation point in the QPSK cluster, and T represents a symbol duration of the signal.

Correspondingly, the input signal y(t) provided to the $M^{th}$ power circuit 11 may be represented as:

$$y(t) = e^{j2\pi \Delta f t} \sum_{k=-\infty}^{\infty} \alpha_k g(t-kT) + n(t) \quad (4)$$

In equation (4), $\Delta f$ represents the carrier frequency offset, and n(t) represents a noise signal.

According to equation (4), an expected value of the filtered signal y(t) raised to the power of 4 may be represented as:

$$\begin{aligned}E\{y^4(t)\} &= E\{[e^{j2\pi \Delta f t} \sum_{k=-\infty}^{\infty} \alpha_k g(t-kT) + n(t)]^4\} = E\{e^{j2\pi 4 \Delta f t} \sum_{m=-\infty}^{\infty} \sum_{n=-\infty}^{\infty} \sum_{k=-\infty}^{\infty} \\ &\sum_{l=-\infty}^{\infty} \alpha_m \alpha_n \alpha_k \alpha_l g(t-mT) g(t-nT) g(t-kT) g(t-lT) + \\ &n^4(t)\} = e^{j2\pi 4 \Delta f t} \sum_{m=-\infty}^{\infty} \sum_{n=-\infty}^{\infty} \sum_{k=-\infty}^{\infty} \sum_{l=-\infty}^{\infty} E \\ &[\alpha_m \alpha_n \alpha_k \alpha_l] g(t-mT) g(t-nT) g(t-kT) g(t-lT) + E[n^4 \\ &(t)] = e^{j2\pi 4 \Delta f t} \sum_{m=-\infty}^{\infty} C_4 g^4(t-mT) + E\{n^4(t)\}\end{aligned} \quad (5)$$

For the constellation point $\alpha_k$ in the QSK cluster, the expected value. $E[\alpha_k] = E[\alpha_k^2] = E[\alpha_k^2] = 0$, and the expected value $E[\alpha_k^4]$ is equal to the parameter $C_4$ and is not equal to 0. Further, the signal $\sum_{m=-\infty}^{\infty} g^4(t-mT)$ in equation (4) is a periodic signal having a period T, and can be represented in form of a Fourier series as:

$$u(t) = \sum_{m=-\infty}^{\infty} g^4(t-mT) = \sum_{k=-\infty}^{\infty} c_k e^{j2\pi \frac{k}{T} t} \quad (6)$$

In equation (6), $c_k$ is:

$$c_k = \frac{1}{T} \int_0^T u(t) e^{-j2\pi \frac{k}{T} t} dt \quad (7)$$

By substituting the equation $u(t) = \sum_{m=-\infty}^{\infty} g^4(t-mT)$, equation (7) may be expanded as:

$$\begin{aligned}c_k &= \frac{1}{T} \int_0^T u(t) e^{-j2\pi \frac{k}{T} t} dt = \frac{1}{T} \int_0^T \sum_{m=-\infty}^{\infty} g^4(t-mT) e^{-j2\pi \frac{k}{T} t} dt \\ &= \frac{1}{T} \sum_{m=-\infty}^{\infty} \int_0^T g^4(t-mT) e^{-j2\pi \frac{k}{T} t} dt \\ &= \frac{1}{T} \sum_{m=-\infty}^{\infty} \int_{-mT}^{-mT+T} g^4(\tau) e^{-j2\pi \frac{k}{T}(\tau + mT)} d\tau \\ &= \frac{1}{T} \sum_{m=-\infty}^{\infty} \int_{-mT}^{-mT+T} g^4(\tau) e^{-j2\pi \frac{k}{T} \tau} d\tau = \frac{1}{T} \int_{-\infty}^{\infty} g^4(\tau) e^{-j2\pi \frac{k}{T} \tau} d\tau\end{aligned} \quad (8)$$

The last algorithm of equation (8) may be regarded as an FFT result of (1/T) multiplied by the frequency (k/T) for $g^4(t)$. That is to say, the parameter $c_k$ is an FFT result of (1/T) multiplied by the frequency (k/T) for $g^4(t)$.

By representing the FFT result of g(t) by G(f), the FFT result of $g^4(t)$ is equal to G(f)*G(f)*G(f)*G(f). Theoretically, the energy distribution range of G(f) is between frequencies (-1/T) and (1/T). Correspondingly, the energy distribution of G(f)*G(f)*G(f)*G(f) is between frequencies (-4/T) and (4/T). It is deduced that, in all parameters $c_k$ in equation (6), only the parameters $c_k$ having corresponding frequencies within the frequency range (-4/T) and (4/T) are not equal to 0. In other words, among all the parameters $c_k$ in equation (6), only 7 parameters, $c_{-3}, c_{-2}, c_{-1}, c_0, c_1, c_2$ and $c_3$, are not equal to 0. Thus, equation (6) can be rewritten as:

$$u(t) = \sum_{m=-\infty}^{\infty} g^4(t-mT) = \sum_{k=-3}^{3} c_k e^{j2\pi \frac{k}{T} t} \quad (9)$$

And equation (4) is rewritten as:

$$E\{y^4(t)\} = e^{j2\pi 4 \Delta f t} \cdot C_4 \cdot \sum_{k=-3}^{3} c_k e^{j2\pi \frac{k}{T} t} + E\{n^4(t)\} \quad (10)$$

According to equation (10), without considering the noise n(t), the $4^{th}$ power calculation result $y^4(t)$ mainly corresponds to signal components of frequencies $(-3/T+4\Delta f)$, $(-2/T+4\Delta f)$, $(-1/T+4\Delta f)$, $4\Delta f$, $(1/T+4\Delta f)$, $(2/T+4\Delta f)$ and $(3/T+4\Delta f)$. Further, the frequencies corresponding to the signal components mainly included in the $4^{th}$ power calculation result $y^4(t)$ may be concluded to a form of $(n/T+4\Delta f)$, where n is an integral index value.

The peak frequency determining circuit 13 identifies a peak value with a maximum amplitude from the $4^{th}$ power spectrum Z(f) generated by the spectrum generating circuit 12, and determines a frequency (to be referred to as a peak frequency $\Omega$) corresponding to the peak value. According to the previously deduced result, the frequencies corresponding to the signal components mainly included in the $4^{th}$ power calculation result $y^4(t)$ may be concluded to a form of $(n/T+4\Delta f)$, where n is an integral index value. Thus, the peak frequency $\Omega$ determined by the peak frequency determining circuit 13 may be equal to or close to the frequency $(n/T+4\Delta f)$ corresponding to one certain index value n. It should be noted that, one spirit of the present invention is that, performing a $4^{th}$ power calculation or a calculation of raising to a power of a multiple of 4 effectively eliminates the randomness of the input signal y(t). It is known based on the foregoing deduction that, regardless of the message carried in the input signal y(t), for any constellation point $\alpha_k$ in the QPSK cluster, the $4^{th}$ power calculation result $y^4(t)$ may be concluded to a form of $(n/T+4\Delta f)$. Accordingly, for any input signal y(t), the peak frequency Q determined by the peak frequency determining circuit 13 is equal to or close to the frequency $(n/T+4\Delta f)$ corresponding to one certain index value n. This characteristic is also applicable to a situation where an input signal y(t), e.g., has an 8 PSK modulation scheme, and the integer M is equal to 8 or a multiple of 8.

Figure 4:
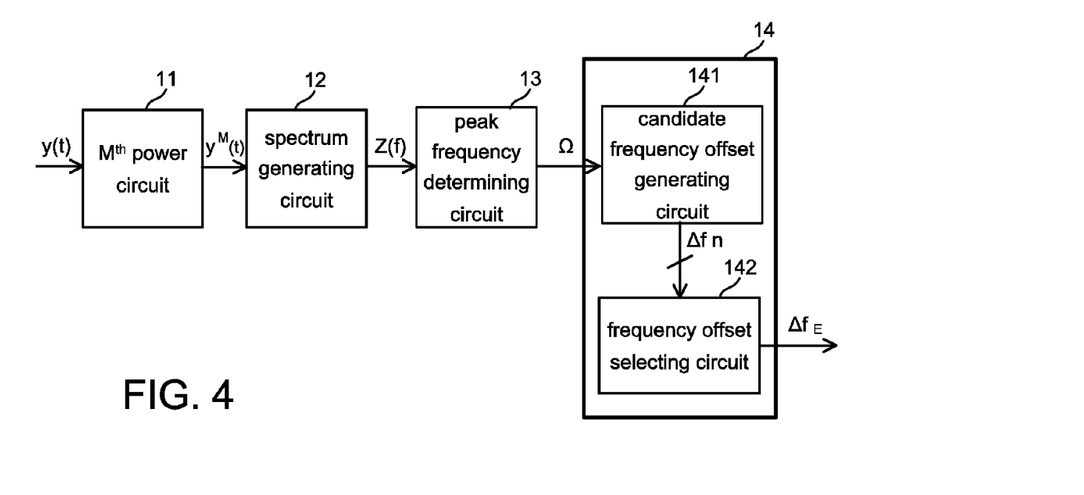
FIG. 4 is a detailed example of a frequency offset determining circuit according to an embodiment of the present invention.

The frequency offset determining circuit 14 determines an estimated carrier frequency offset $\Delta f_E$ according to the peak frequency $\Omega$ determined by the peak frequency determining circuit 13. As shown in FIG. 4, in one detailed embodiment, the frequency offset determining circuit 14 includes a candidate frequency offset generating circuit 141 and a frequency offset selecting circuit 142. The candidate frequency offset generating circuit 141 generates a plurality of candidate frequency offsets according to the peak frequency $\Omega$. The frequency offset selecting circuit 142 selects one estimated carrier frequency offset $\Delta f_E$ from the plurality of candidate frequency offsets, as an output signal of the carrier frequency offset estimating apparatus 100.

Based on the foregoing deduction of $\Omega \cong n/T + 4\Delta f_n$, the candidate frequency offset generating circuit 141 may identify multiple candidate frequency offsets $\Delta f_n$ corresponding to different index values n as the candidate frequency offsets. For example, corresponding to an index value n=−3, the candidate frequency offset generating circuit 141 obtains one candidate frequency offset $\Delta f_{-3}=(\Omega+3/T)/4$, corresponding to an index value n=−2, the candidate frequency offset generating circuit 141 obtains one candidate frequency offset $\Delta f_{-2}=(\Omega+2/T)/4$, corresponding to an index value n=−1, the candidate frequency offset generating circuit 141 obtains one candidate frequency offset $\Delta f_{-1}=(\Omega+1/T)/4$, and so forth.

It should be noted that, the above concept may be extended to other integers M (i.e., other situations where M is not equal to 4). More specifically, the candidate frequency offset generating circuit 141 may generate a plurality candidate frequency offsets $\Delta f_n$:

$$\Omega \cong \frac{n}{T} + M\Delta f_n \qquad (11)$$

In practice, the range of the index value n that the candidate frequency offset generating circuit 141 uses to generate the candidate frequency offsets is not limited to specific values. For example, the candidate frequency offset generating circuit 141 may generate 201 candidate candidate frequency offsets for 201 possibilities for index values n=−100 to 100 for the frequency offset selecting circuit 142. In one embodiment, the candidate frequency offset generating circuit 141 is designed to select a candidate frequency offset in a predetermined frequency range, which is associated with a sampling frequency $f_s$ previously applied on the input signal y(t). For example, the sampling frequency $f_s$ may be a sampling frequency applied while the filtered signal y(t) passes an analog-to-digital converter (ADC) in the receiver coordinating with the carrier frequency offset estimating apparatus 100 before the filtered signal y(t) enters the $M^{th}$ power circuit 11. Generally known to one person skilled in the art, the range of the sampling frequency $f_s$ limits the signal range perceptible to the carrier frequency offset estimating apparatus 100. More specifically, the carrier frequency offset estimating apparatus 100 is able to perceive signals between the frequency range $(-f_s/2)$ and $(f_s/2)$. Thus, the candidate frequency offset generating circuit 141 may select the candidate frequency offsets $\Delta f_n$ corresponding to which indices n according to the value of the sampling frequency $\Delta f_n$, e.g, selecting candidate frequency offsets $\Delta f_n$ with absolute values smaller than the frequency $(f_s/2)$. Assume that the peak frequency $\Omega$ that the peak frequency determining circuit 13 determines from the $4^{th}$ power is −12 MHz, and the reciprocal (1/T) of the symbol duration T is 20 MHz. According to the equation $\Delta f_n = (\Omega - n/T)$, it may be calculated that $\Delta f_{-9}$ is 42 MHz, $\Delta f_{-8}$ is 37 MHz, $\Delta f_{-7}$ is 32 MHz, ..., $\Delta f_7$ is −38 MHz, and $\Delta f_8$ is −43 MHz. If the sampling frequency $f_s$ is 80 MHz, the candidate frequency offset generating circuit 141 may only select the candidate frequency offset $\Delta f_n$ having absolute values smaller than 40 MHz, i.e., only selecting 16 candidate frequency offsets, including $\Delta f_{-8}$, $\Delta f_{-7}$, ... and $\Delta f_7$, and provide them the frequency offset selecting circuit 142.

Several methods that the frequency offset selecting circuit 142 may use to select the estimated carrier frequency offset $\Delta f_E$ are described below.

Figure 5A:
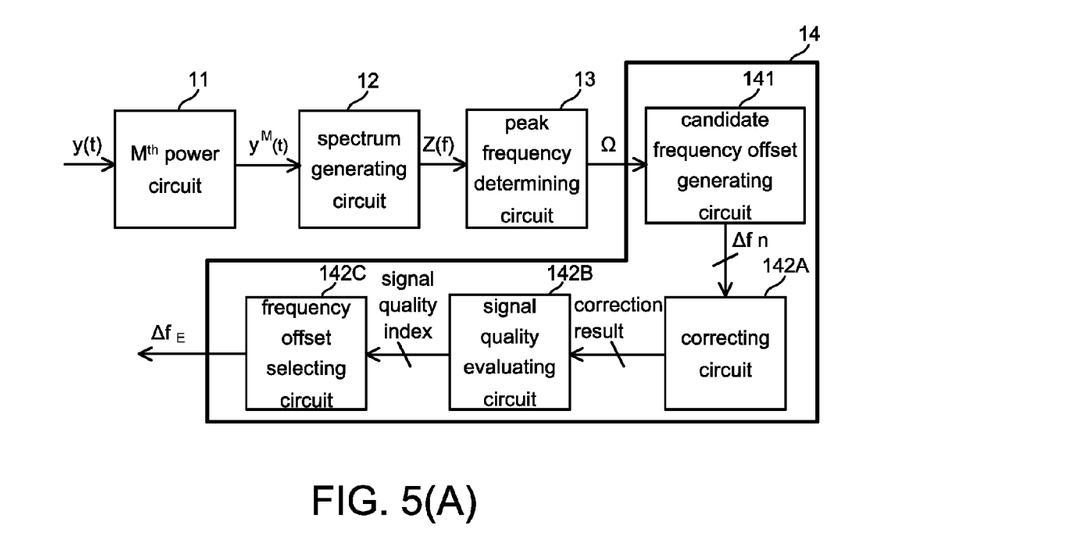
FIG. 5(A) and FIG. 5(B) are two detailed examples of a frequency offset selecting circuit according to an embodiment of the present invention.

FIG. 5(A) shows a detailed embodiment of the frequency offset selecting circuit 142. In this embodiment, the frequency offset selecting circuit 142 includes a correcting circuit 142A, a signal quality evaluating circuit 142B and a frequency offset selecting circuit 142C. The correcting circuit 142A corrects the filtered signal y(t) according to the plurality of candidate frequency offsets $\Delta f_n$ to generate a plurality of corresponding correction results. The signal quality evaluating circuit 142B generates a signal quality index for each of the plurality of correction results. For example, the correcting circuit 142A may be a mixer, and the signal quality evaluating circuit 142B may be a decoder, but the present invention is not limited herein. The mixer mixes the filtered signal y(t) with a clock signal having a frequency equal to a candidate frequency offset $\Delta f_n$ to generate a mixed result as the correction result. The decoder decodes the correction results to determine the accuracy of the decoded results. For example, the signal quality index may be a bit error rate or a packet error rate, but the present invention is not limited herein. From the plurality of candidate frequency offsets $\Delta f_n$, the frequency offset selecting circuit 142C selects a candidate frequency offset corresponding to an optimum signal quality index (e.g., a candidate frequency offset with the lowest packet error rate) as the estimated carrier frequency offset $\Delta f_E$.

Figure 5B:
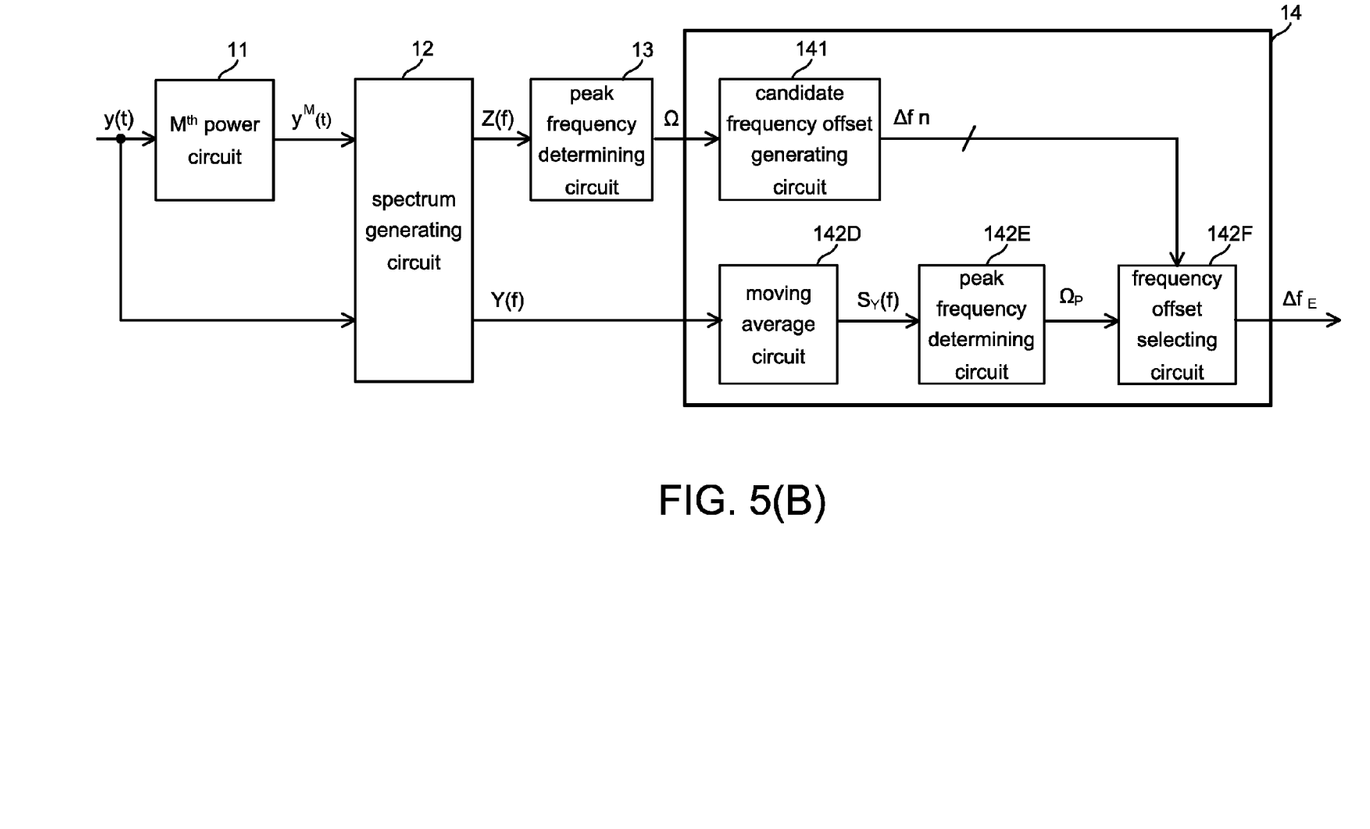

FIG. 5(B) shows another detailed embodiment of the frequency offset selecting circuit 142. In this embodiment, the frequency offset selecting circuit 142 includes a moving averaging circuit 142D, a peak frequency determining circuit 142E and a frequency offset selecting circuit 142F. As shown in FIG. 5(B), the spectrum generating circuit 12 in this embodiment is further used to generate a filtered signal spectrum Y(f) for the filtered signal y(t). The moving averaging circuit 142D performs a moving average calculation on the filtered signal spectrum Y(f) to generate a moving average result $S_Y(f)$. In practice, for example but not limited to, the moving averaging circuit 142D may generate the moving average result $S_Y(f)$ by a simple moving average calculation. In other words, the moving averaging circuit 142D may generate the $S_Y(f)$ according to an equation:

$$S_Y(f) = \int_{-\frac{1}{D}}^{\frac{1}{D}} |Y(f+\alpha)|d\alpha \qquad (12)$$

In equation (11), D represents an average range parameter, and dα represents an integration variance. It should be noted that, details of the moving average calculation are generally known to one person skilled in the art, and shall be omitted herein.

The function of the moving average calculation is to eliminate minute disturbances caused by surges in the filtered signal spectrum Y(f). The peak frequency determining circuit 142E determines a frequency (to be referred to as a power peak frequency $\Omega_P$) corresponding to a power peak from the moving average result $S_Y(f)$. Next, from the plurality of candidate frequency offsets $\Delta f_n$ provided by the candidate frequency generating circuit 141, the frequency offset selecting circuit 142F selects a candidate frequency offset closest to the power peak frequency $\Omega_P$ as the estimated carrier frequency offset $\Delta f_E$. For example, assume that the peak frequency determining circuit 142E determines the power peak frequency $\Omega_P$ as 12 MHz, and the candidate frequency offset generating circuit 141 provides 8 candidate frequency offsets, including −17 MHz, −12 MHz, −7 MHz, −2 MHz, 3 MHz, 8 MHz, 13 MHz and 18 MHz. Because 13 MHz among the candidate frequency offsets is closest to the power peak frequency $\Omega_P$, the frequency offset selecting circuit 14F may select 13 MHz as the estimated carrier frequency offset $\Delta f_E$.

In practice, the peak frequency determining circuit 13 and the frequency offset determining circuit 14 may be realized by various kinds of control and processing platforms, including fixed and programmable logic circuits, e.g., programmable logic gate arrays, application-specific integrated circuits (ASIC), microcontrollers, microprocessors, and digital signal processors (DSP). Further, the peak frequency determining circuit 13 and the frequency offset determining circuit 14 may also be designed as a processor instruction stored in a memory (not shown), and the processor instruction may be executed to perform various tasks. One person skilled in the art can understand that, there are many other circuit configurations and elements capable of realizing the concept of the present invention without departing from the spirit of the present invention.

Figure 6:
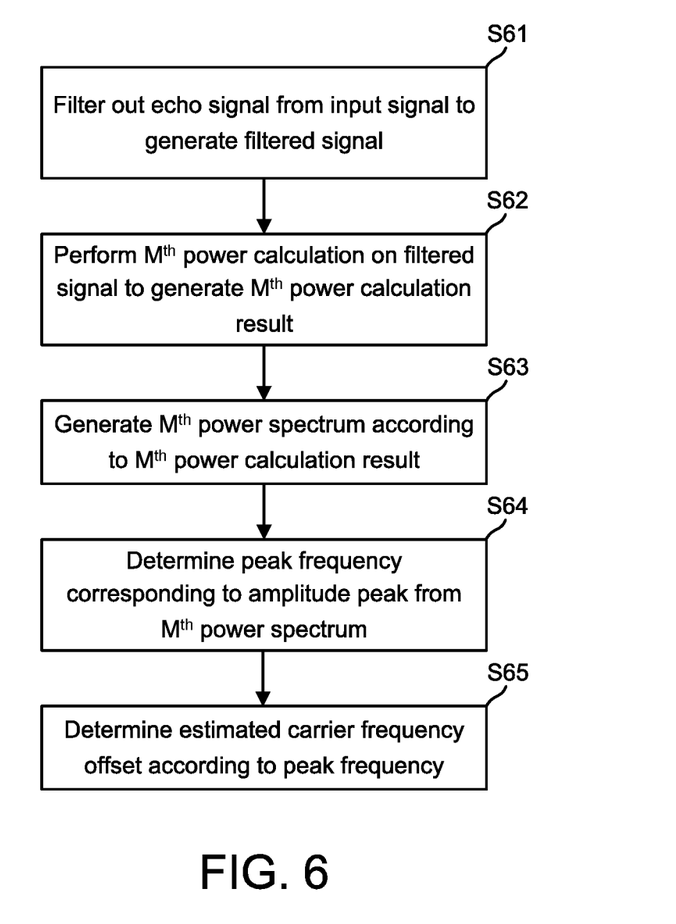
FIG. 6 is a flowchart of a carrier frequency offset estimating method according to an embodiment of the present invention.

FIG. 6 shows a flowchart of a carrier frequency offset estimating method according to another embodiment of the present invention. In step In step S61, an echo signal is filtered out from an input signal to generate a filtered signal. In step S62, an $M^{th}$ power calculation is performed on the filtered signal to generate an $M^{th}$ power calculation result, where M is an integer greater than 1 and is associated with a modulation scheme of the input signal. In step S63, an $M^{th}$ power spectrum is generated according to the $M^{th}$ power calculation result. In step S64, a peak frequency corresponding to an amplitude peak is determined from the $M^{th}$ power spectrum. In step S65, an estimated carrier frequency offset is determined according to the peak frequency.

One person skilled in the art can understand that, operation variations (e.g., methods for selecting a filter condition) in the description associated with the carrier frequency offset estimating apparatus 100 are applicable to the carrier frequency offset estimating method in FIG. 6, and shall be omitted herein.

It should be noted that, the mathematical expressions in the disclosure are for illustrating principles and logics associated with the embodiments of the present invention. Unless otherwise specified, these mathematical expressions do not levy limitations to the present invention. One person skilled in the art can understand that, there are various other technologies capable of realizing the physical forms corresponding to these mathematical expressions.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A carrier frequency offset estimating apparatus, suitable for multipath signals, comprising:
   an echo signal filtering circuit, filtering out an echo signal from an input signal to generate a filtered signal;
   an $M^{th}$ power circuit, performing an $M^{th}$ power calculation on the filtered signal to generate an $M^{th}$ power calculation result, where M is an integer greater than 1 and is associated with a modulation scheme applied to the input signal;
   a spectrum generating circuit, generating an $M^{th}$ power spectrum according to the $M^{th}$ power calculation result;
   a peak frequency determining circuit, determining a peak frequency corresponding to an amplitude peak from the $M^{th}$ power spectrum; and
   a frequency offset determining circuit, determining an estimated carrier frequency offset according to the peak frequency,
   wherein the echo signal filtering circuit comprises:
   a spectrum generating circuit, generating an input signal spectrum according to the input signal;
   a smoothing circuit, performing a smoothing process on the input signal spectrum to generate a smoothed spectrum; and
   a control circuit, determining a filter condition according to the smoothed spectrum, and
   wherein the control circuit determines a frequency to be filtered out according to a frequency corresponding to a power peak in the smoothed spectrum.

2. The apparatus according to claim 1, wherein the smoothing process is a moving averaging calculation.

3. The apparatus according to claim 1, wherein the echo signal filtering circuit comprises:
   a notch filter, filtering the input signal to generate the filtered signal.

4. The apparatus according to claim 1, wherein the modulation scheme applied to the input signal is quadrature phase-shift keying (QPSK) and the integer M is an integral multiple of 4.

5. A carrier frequency offset estimating method, suitable for multipath signals, comprising:
   a) filtering out an echo signal from an input signal to generate a filtered signal;
   b) performing an $M^{th}$ power calculation on the filtered signal to generate an $M^{th}$ power calculation result, where M is an integer greater than 1 and is associated with a modulation scheme applied to the input signal;
   c) generating an $M^{th}$ power spectrum according to the $M^{th}$ power calculation result;
   d) determining a peak frequency corresponding to an amplitude peak from the $M^{th}$ power spectrum; and
   e) determining an estimated carrier frequency offset according to the peak frequency,
   the method further comprising, before step (a):
   generating an input signal spectrum according to the input signal;
   performing a smoothing process on the input signal spectrum to generate a smoothed spectrum; and
   determining a filter condition according to the smoothed spectrum,
   wherein the step of determining the filter condition comprises:
   determining a frequency to be filtered out according to a frequency corresponding to a power peak in the smoothed spectrum.

6. The method according to claim 5, wherein the smoothing process is a moving averaging calculation.

7. The method according to claim 5, wherein the step of determining the filter condition comprises:
   identifying a reference point different from the power peak from the smoothed spectrum, and determining the filtering intensity according to a power difference between the power peak and the reference point.

8. The method according to claim 5, wherein step (a) comprises performing a notch filtering process on the input signal to generate the filtered signal.

9. The method according to claim 5, wherein the modulation scheme applied to the input signal is quadrature phase-shift keying (QPSK) and the integer M is an integral multiple of 4.

10. A carrier frequency offset estimating apparatus, suitable for multipath signals, comprising:

an echo signal filtering circuit, filtering out an echo signal from an input signal to generate a filtered signal;

an $M^{th}$ power circuit, performing an $M^{th}$ power calculation on the filtered signal to generate an $M^{th}$ power calculation result, where M is an integer greater than 1 and is associated with a modulation scheme applied to the input signal;

a spectrum generating circuit, generating an $M^{th}$ power spectrum according to the $M^{th}$ power calculation result;

a peak frequency determining circuit, determining a peak frequency corresponding to an amplitude peak from the $M^{th}$ power spectrum; and a frequency offset determining circuit, determining an estimated carrier frequency offset according to the peak frequency, wherein the echo signal filtering circuit comprises:
 a spectrum generating circuit, generating an input signal spectrum according to the input signal;
 a smoothing circuit, performing a smoothing process on the input signal spectrum to generate a smoothed spectrum; and
 a control circuit, determining a filter condition according to the smoothed spectrum, and wherein the control circuit determines a filtering intensity according to a relationship between a power peak in the smooth spectrum and the smoothed spectrum.

11. The apparatus according to claim 10, wherein the control circuit identifies a reference point different from the power peak from the smoothed spectrum, and determines the filtering intensity according to a power difference between the power peak and the reference point.

12. A carrier frequency offset estimating method, suitable for multipath signals, comprising:
 a) filtering out an echo signal from an input signal to generate a filtered signal;
 b) performing an $M^{th}$ power calculation on the filtered signal to generate an $M^{th}$ power calculation result, where M is an integer greater than 1 and is associated with a modulation scheme applied to the input signal;
 c) generating an $M^{th}$ power spectrum according to the $M^{th}$ power calculation result;
 d) determining a peak frequency corresponding to an amplitude peak from the $M^{th}$ power spectrum; and
 e) determining an estimated carrier frequency offset according to the peak frequency,
the method, before step (a), further comprising:
generating an input signal spectrum according to the input signal;
performing a smoothing process on the input signal spectrum to generate a smoothed spectrum; and
determining a filter condition according to the smoothed spectrum, and
wherein the step of determining the filter condition comprises determining a filtering intensity according to a relationship between a power peak in the smooth spectrum and the smoothed spectrum.

* * * * *